United States Patent [19]

Rees

[11] Patent Number: 4,466,734

[45] Date of Patent: Aug. 21, 1984

[54] COMPACT FULL FRAME ILLUMINATION AND IMAGING SYSTEM FOR A PHOTOCOPIER

[75] Inventor: James D. Rees, Pittsford, N.Y.

[73] Assignee: Xerox Corporation, Stamford, Conn.

[21] Appl. No.: 536,144

[22] Filed: Sep. 26, 1983

Related U.S. Application Data

[63] Continuation of Ser. No. 372,581, Apr. 28, 1982, abandoned.

[51] Int. Cl.$^3$ ........................ G03B 27/36; G03B 27/38

[52] U.S. Cl. ........................................ 355/58; 355/67

[58] Field of Search ...................... 355/11, 57, 58, 55, 355/67

[56] References Cited

U.S. PATENT DOCUMENTS

| | | | |
|---|---|---|---|
| 3,897,148 | 7/1975 | Ritchie et al. | 355/58 |
| 4,116,554 | 9/1978 | Libby et al. | 355/11 |
| 4,196,986 | 4/1980 | Moyroud | 355/67 X |
| 4,241,392 | 12/1980 | Boone | 355/67 X |
| 4,250,538 | 2/1981 | Durbin et al. | 355/67 X |
| 4,260,250 | 4/1981 | McCormick-Goodhart | 355/67 X |
| 4,329,045 | 5/1982 | Rees et al. | 355/67 |
| 4,348,105 | 9/1982 | Caprari | 355/67 |

*Primary Examiner*—Richard A. Wintercorn

[57] ABSTRACT

A compact, full-frame flash illumination system is disclosed. In a unity mode of operation, a lens, mounted within a light housing, projects an image of a document onto a photoreceptor belt. In a reduction mode of operation, the lens is translated towards the photoreceptor along a non-linear path which maintains document registration at the image plane. Simultaneously, the platen is translated upward by a mechanical drive arrangement to maintain conjugate requirements.

11 Claims, 5 Drawing Figures

COMPACT FULL FRAME ILLUMINATION AND IMAGING SYSTEM FOR A PHOTOCOPIER

This is a continution, of application Ser. No. 372,581, filed Apr. 28, 1982, now abandoned.

The present invention relates to an optical illumination and imaging system for a photocopier and, more particularly, to a system which utilizes a small aperture, wide-angle, relative illumination compensated imaging lens, an efficient, integrating cavity, light housing and a movable platen/lens arrangement to enable reduction modes of operation.

As demands for faster copying and duplicating have increased, conventional machines which scan documents in incremental fashion to provide a flowing image on a xerographic drum have proved inadequate. New high speed techniques have evolved which utilize flash exposure of an entire document (full-frame exposure) and the arrangement of a moving photoconductor in a flat condition at the instant of exposure.

One example of a high speed, multi-magnification machine is the Xerox 9200 copier/duplicator. This machine utilizes a flash illumination system wherein a relatively narrow angle (~17°) lens projects a document image along a folded optical path onto a flat photoreceptor. In a reduction mode, the lens is translated towards the imaging plane and a plurality of add-lenses are moved into the optical path to maintain proper focus.

Another example of a full-frame flash system is that disclosed in U.S. Pat. No. 4,116,554. In this system, a magnification capability is enabled by utilizing a combined lens and mirror translation.

Machines of the type described above require relatively large space requirements to house the illumination and imaging components. A more compact, reproduction machine which retains the high copying rate associated with full frame flash systems and which provides an economical, continuous reduction mode capability is most desirable. Applicants have realized such a system by using a wide angle (~35°), small aperture lens set on the bottom surface of a highly efficient, integrating cavity in which a flash lamp is mounted. At unity magnification the system has total overall conjugate of ~24" (600 mm) enabling a simple, compact "straight through" imaging (e.g. no folding mirrors) onto a photoreceptor belt parallel to the document platen. The $\cos^4$ illumination fall-off concomitant with such a wide angle system is corrected by a variable density filter attached to the lens. In a reduction mode, the total conjugate is adjusted by vertically translating the document platen while simultaneously moving the lens along a short non-linear path to maintain proper corner registration and object/image through a continuous magnification change.

A better understanding of the present invention can be had with reference to the following description in conjunction with the accompanying drawings wherein.

DESCRIPTION

General

Figure 1:
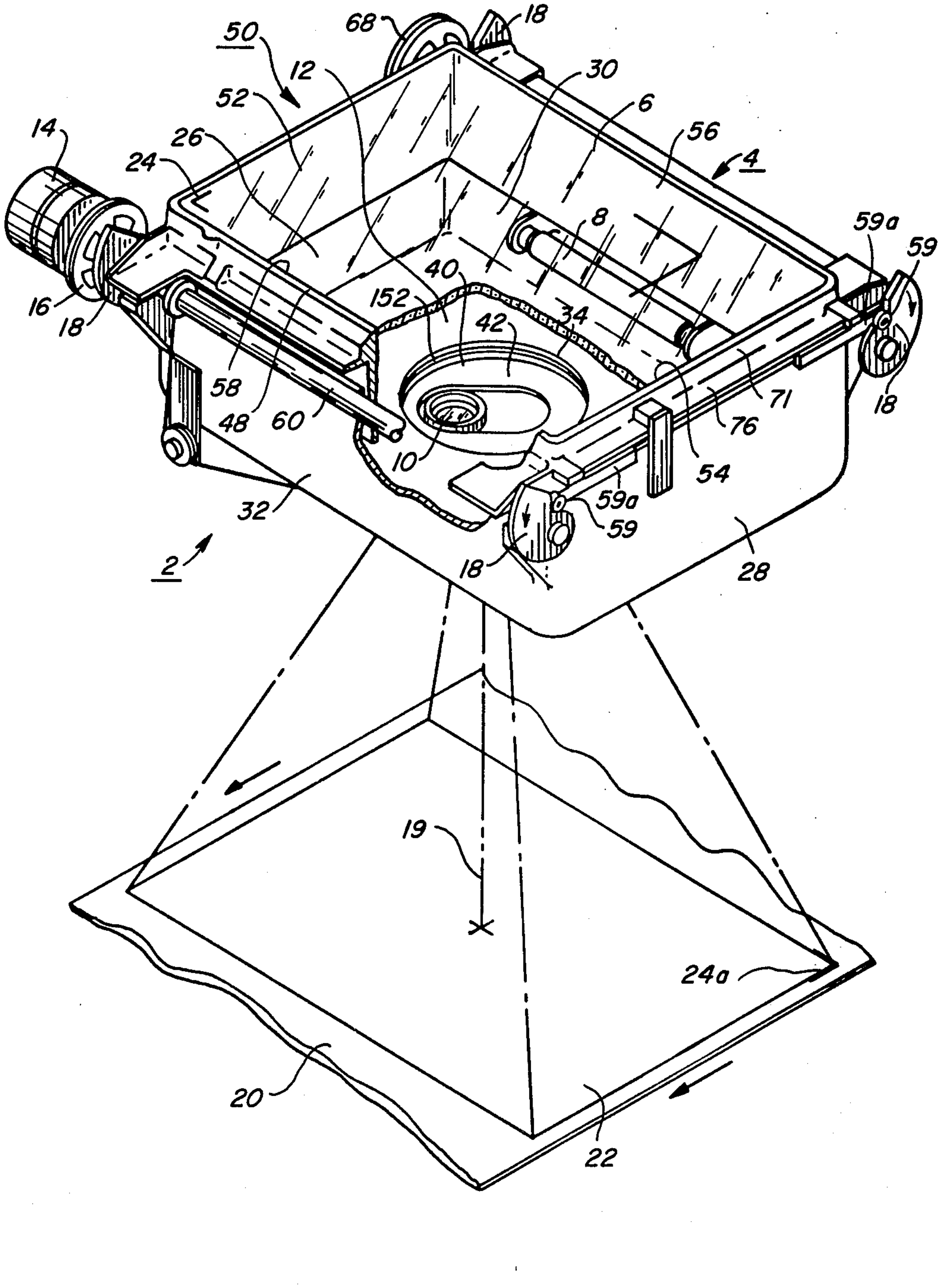
FIG. 1 is a perspective view of the illumination and imaging system of the invention in a 1× magnification mode.
Figure 2:
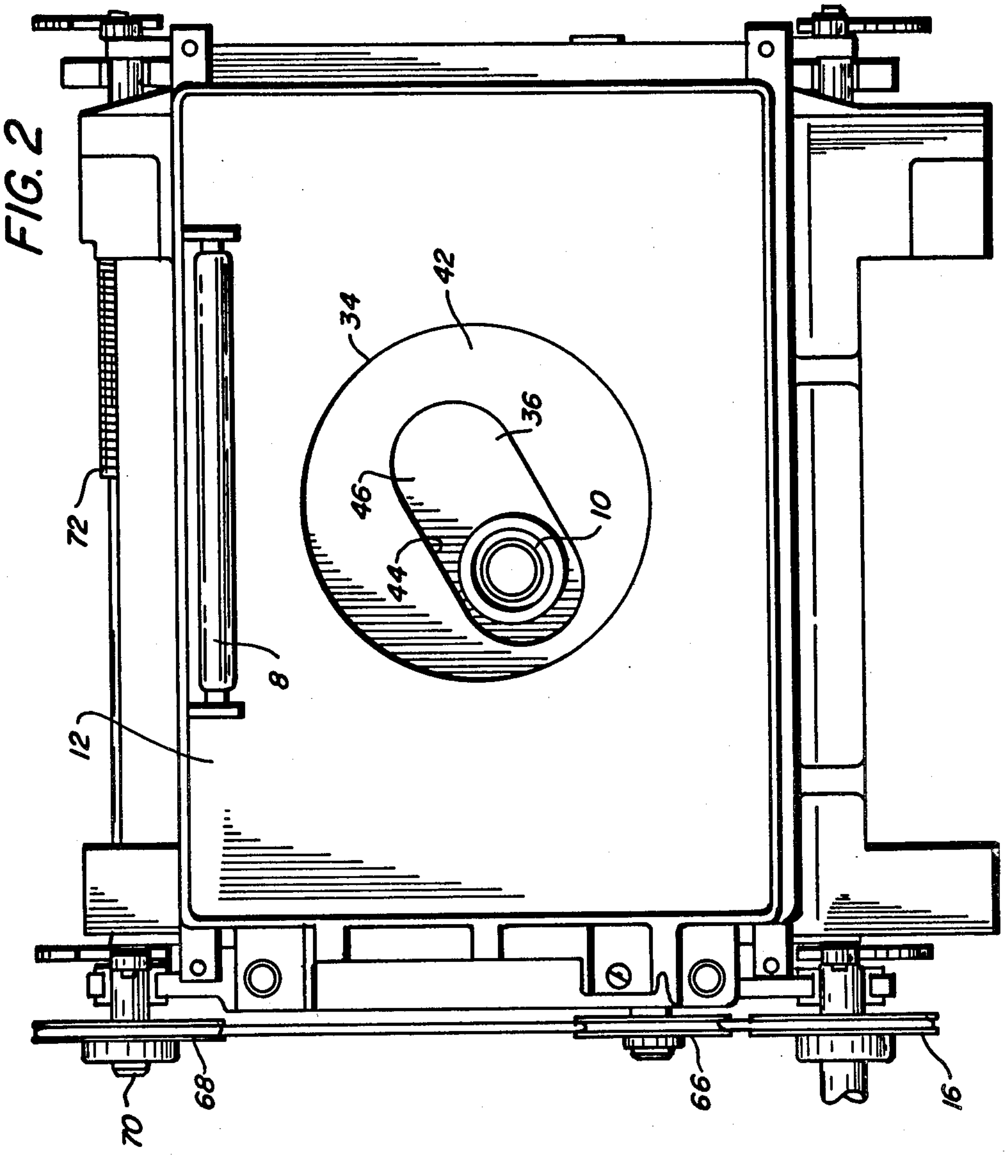
FIG. 2 is a top view of the assembly of FIG. 1.

Referring now to FIGS. 1 and 2, there is shown a preferred embodiment of a document illumination and imaging system 2 which incorporates the document registration system of the present invention. The system generally comprises a light housing 4 the top surface of which is defined by a transparent platen 6 upon which a document (not shown) is placed. Within housing 4 is a flash lamp 8 connected to a power source (not shown). Wide angle lens 10 is movably mounted within floor 12 of the housing. Drive motor 14 drives main pulley 16 which provides motion to four platen elevation cams 18 through a pulley/cable arrangement described in greater detail below. In a reduction mode of operation, platen 6 is vertically displaced upward while lens 10 is simultaneously translated along a short, non-linear path towards photoreceptor belt 20, a portion of which is shown in FIG. 1.

During a copying mode, lamp 8 is pulsed and the underside of platen 6 is uniformly illuminated. The document image passes through lens 10 shown in the 1× position with the top of the lens approximately flush with housing floor 12. The projected light image discharges the previously charged surface of belt 20 whereby there remains on the surface a latent electrostatic image 22. Assuming the document being copied has an $8\frac{1}{2}\times11''$ dimension, the exposed image area will be $8\frac{1}{2}\times11''$. The document is corner registered at a platen registration guide mark 24. This registration corner is projected onto belt 20 at point 24A. Belt 20 moves in the indicated direction to bring an unexposed portion of the belt into the exposure position. (An exemplary photoreceptor belt for use in the present system is disclosed in U.S. Pat. No. 4,265,990).

It will be appreciated that the document exposure system, as disclosed above, forms part of a series of subsystems which are combined within a single housing to form the multi-magnification document copying machine. The other machine functions; e.g. charging of the photoreceptor, image development, transfer of developed image, and cleaning of the photoreceptor are well known in the art and hence are not set forth herein.

Light Housing

Referring to FIGS. 1 and 2, housing 4 comprises lower left, right, back and front walls 26, 28, 30 and 32 respectively. Lens 10 is seated in an aperture 34 formed in housing floor 12. The lens is mounted in a lens carriage assembly 40 which has a top surface 42, a portion of which is visible in FIG. 1. When lens 10 is in the 1× position shown, surface 42, and lens 10, are approximately flush with the surface of housing floor 12. Surface 42 has a slot-like aperture 44 formed thereon. Lens 10 is secured within an aperture formed in lens mounting plate 46. Plate 46 is maintained in a sliding, light-tight relationship with the bottom of surface 42. The operation of the various components of the lens carriage assembly are described in greater detail below. These components have been introduced at this point only insofar as they effectively form part of the light housing.

Continuing with the description of the light housing, platen 6 defines the top of the housing. Platen registration guide mark 24 serves to locate a document corner position. Both surfaces of the platen may be coated with an anti-reflective material so as to prevent any platen-derived specular reflection from entering the lens. In a normal copying mode, a platen cover, pivotably attached to the side of the housing, will be lowered to form a nearly light-tight cover over the document. If the platen cover is left open, the operator is protected from flash light by the provision of appropriately shaped translucent blocking elements above and to the sides of the lamp 8. For ease of description, the platen cover and blockers are not shown.

The platen is mounted within aperture 48 formed within aperture frame member 50. Frame member 50 is an integral unit having side walls 52, 54, 56, and 58. Each side wall has a cam follower member 59, each associated with its respective platen elevation cam 18. These side walls are interior to side walls 26, 28, 30 and 32, respectively and effectively comprise extensions of these walls as the platen is translated in a vertical direction, as will be described below. In the 1× position, the visible portion of the side walls 52, 54,56,58 form approximately ½ of the total interior wall surface.

All the interior surfaces of housing 4 are coated with a high (90% minimum) reflectivity material such as celanese polyester thermal setting paint No. 741-13. All interior surfaces including the side walls, floor and all visible portions of lens carriage 40 are coated thusly, thereby making these surfaces diffusely reflective to light impinging therein. When lamp 8 is pulsed and caused to flash, light is directed against these coated surfaces, undergoing one or more reflections and irradiating the underside of the platen with a generally uniform level of illumination. The bottom surface of the platen cover and the white portions of the document also effectively form part of the housing since some light is reflected from their surfaces.

From the above description, housing 4 is seen to function as a highly efficient light integrating cavity which provides a uniform illumination level along the bottom of the document plane. The total cavity gain can be controlled, to some extent by tailoring the reflectivity of the area directly behind the lamp. For example, small strips of a thermally stable material, of variable width and absorptivity can be fastened to the housing wall.

Platen Drive

Figure 3:
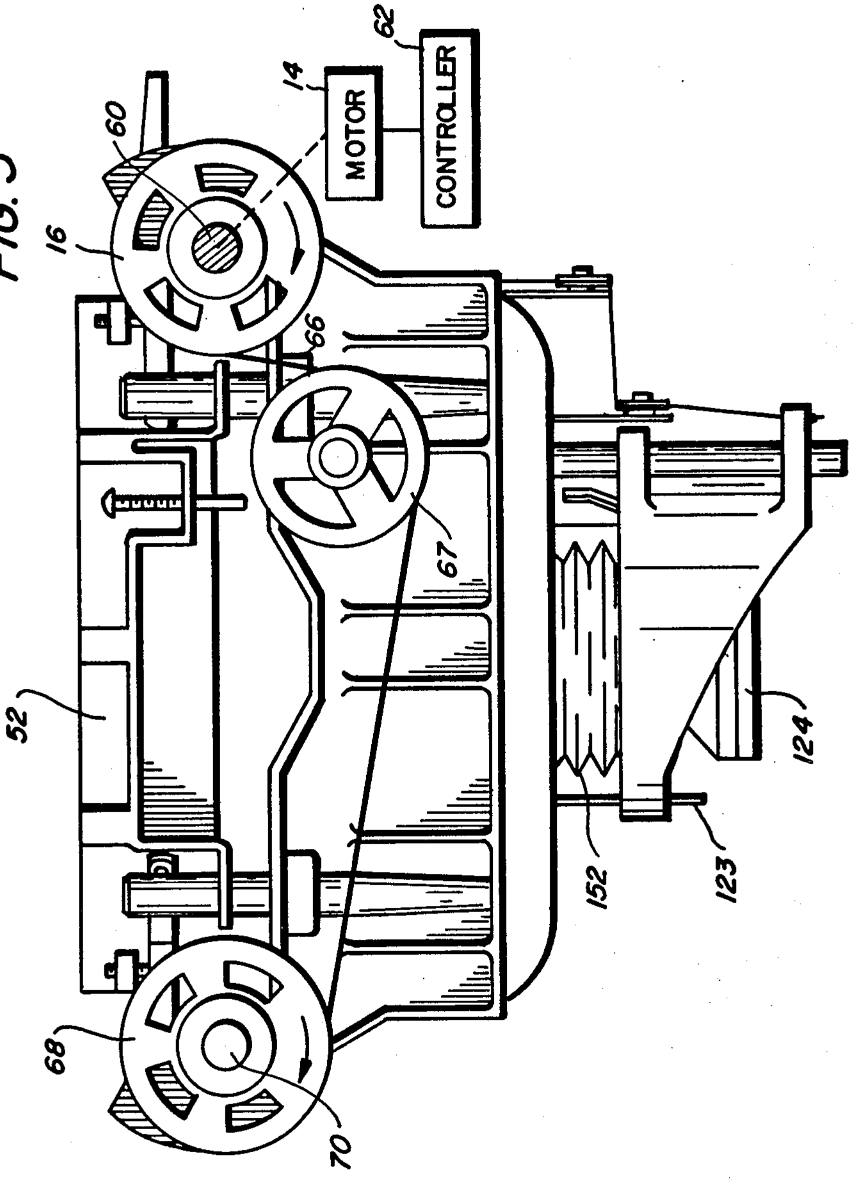
FIG. 3 is a left side view of the assembly of FIG. 1.

Referring to FIGS. 1–4, the platen 6 is driven in a vertical direction via reversible drive motor 14 operating under the control of a machine logic control circuit. A first shaft 60 is driven by motor 14 in response to signals from controller 62 (FIG. 3). Controller 62 contains the logic and memory circuits to continually track the instant position of the lens and platen and to provide signals to the motor to drive shaft 60 in a direction and for a duration determined by the specific magnification setting. An exemplary controller circuit for accomplishing this function is disclosed in U.S. Pat. No. 4,316,668.

Shaft 60 drives main drive pulley 16 to which is attached drive cable 66 (FIG. 3). The other end of cable 66 is entrained via idler pulley 67 upon a second take-up pulley 68 which is fixedly attached to shaft 70 and rotates therewith. Shaft 70 has a counter-torsion spring 72 (FIG. 2) attached at one end thereof to provide a tensioning force to drive cable 66. Fixedly attached to each end of drive shafts 60 and 70 are the platen elevation cams 18. In moving from a 1× to a reduction position, pulleys 16 and 68 rotate in opposite directions (as shown in FIG. 3), the cams 18 rotate in opposite directions to provide an upward force to the platen frame member 50 and hence to platen 6, via the cam followers 59. an initial adjustment is made at pulley 68 to orient the cams in the same position. Cam follower arms **59*a* provide adjustment for overall conjugate change and platen leveling. As the frame member 50 moves upward, it slides past a mylar seal separating side walls 52, 54, 56, 58** from the abutting lower side walls of the light housing.

The cams in FIG. 1, are shown fully seated in the 1× position with the distance between the center of cam followers 59 and the center of shafts 60, 70 being at a minimum. When a reduction mode is enabled, the cam rotates in the direction shown and the center-to-center distance increases in a non-linear fashion which is directly related to the upward translation of the platen frame member and, hence, of the platen. At the extreme cam position, corresponding to a 0.647× reduction (FIG. 5) the platen will have moved upward to its maximum position. On return to higher magnification ratios, the rotation of the cam is reversed and the weight of the platen ensures an even platen descent following, again, the cam 18 surface.

Lens and Lens Drive Mechanism

Figure 4:
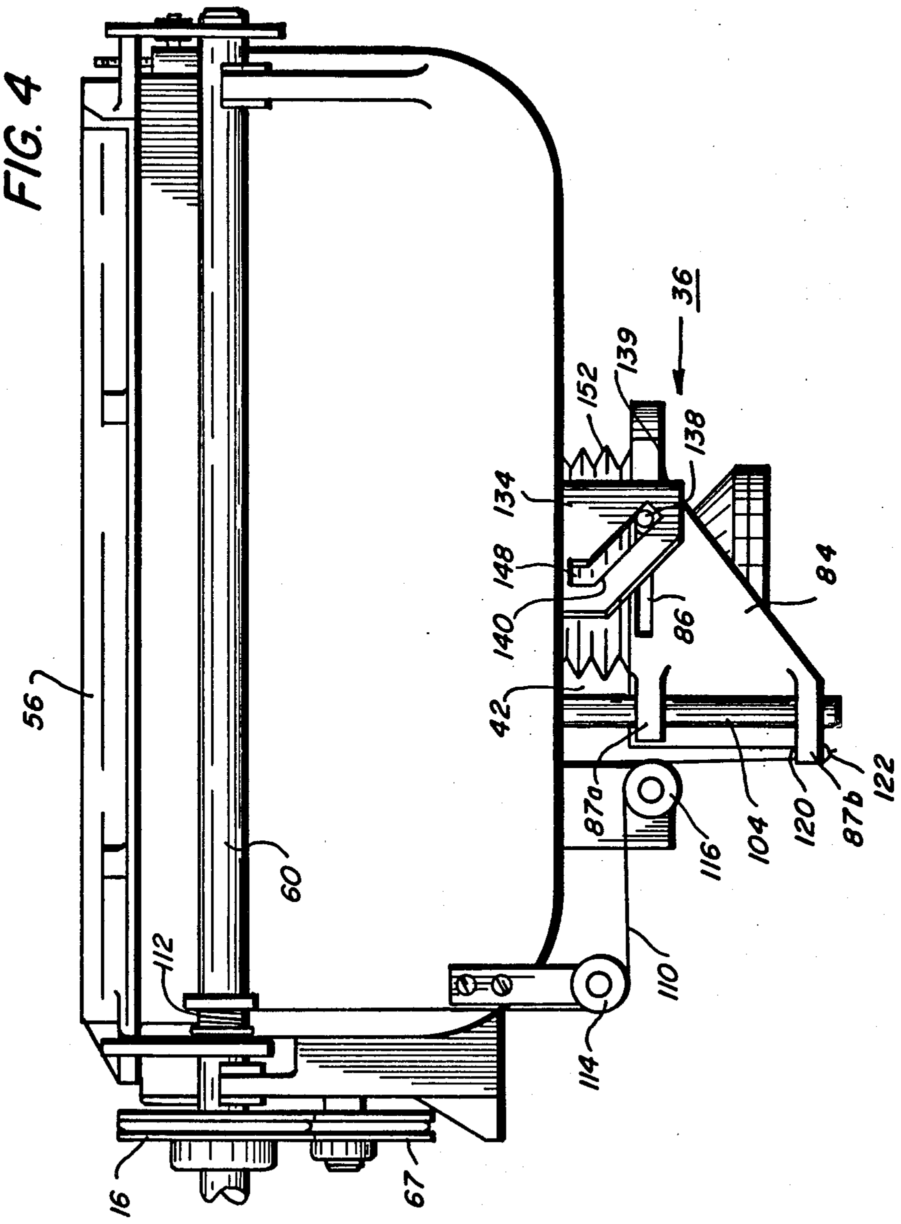
FIG. 4 is a rear view of the assembly of FIG. 1.
Figure 5:
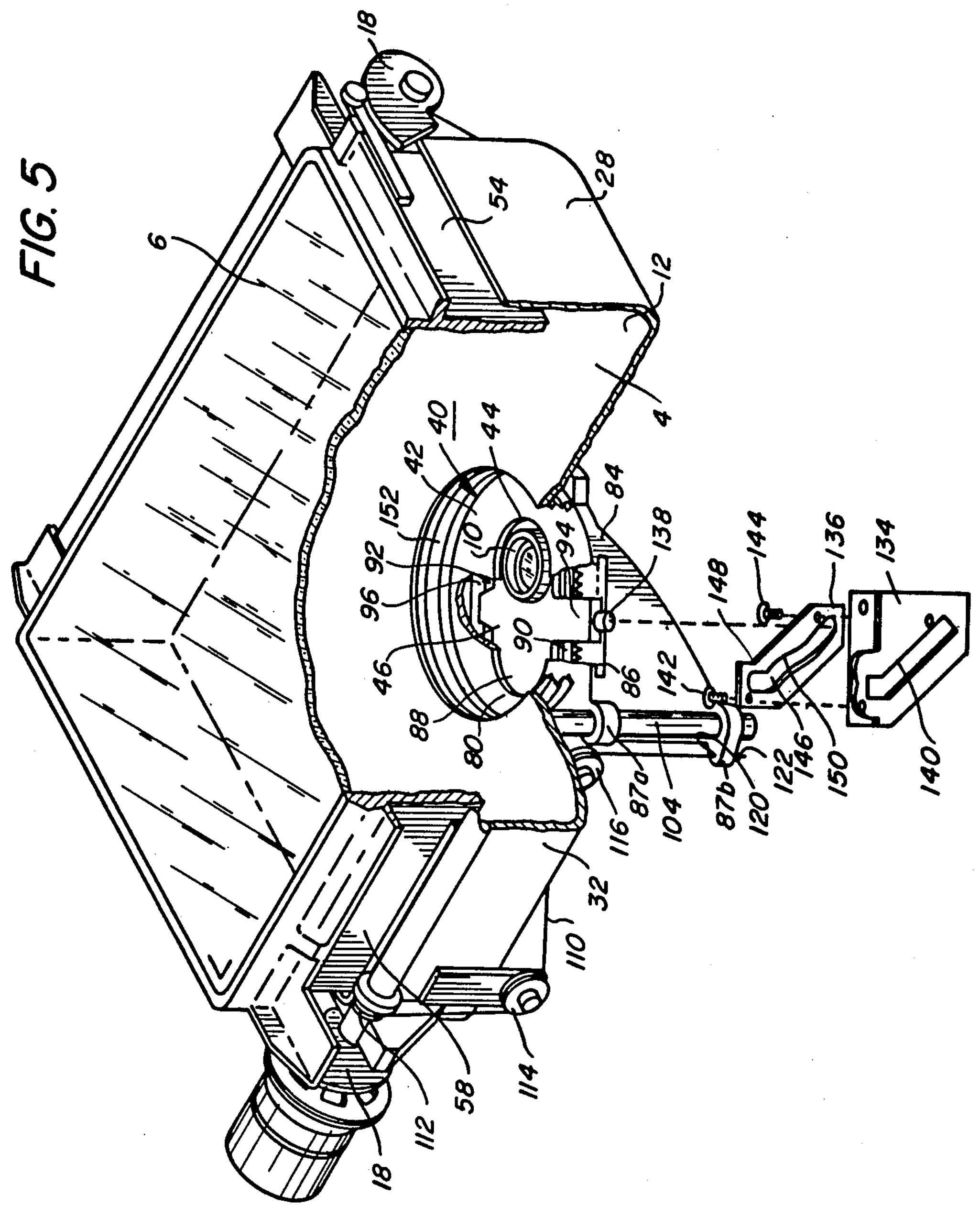
FIG. 5 is a perspective view of the illumination and imaging assembly in a 0.647× magnification mode.

In a preferred embodiment lens 10 is an f/10, fixed focus, wide angle lens (~35°). Over a 1.0 to 0.647× magnification range, the effective *f* number varies from 20 to 16.47 and semi-field angle from 35.8 to 34.5 respectively. In FIG. 1, the lens was shown in the 1× position and, as briefly described the lens was mounted in a mounting plate 46 which, in turn, formed part of a lens carriage assembly 40. FIGS. 4 and 5 show the lens in a 0.647× reduction position with FIG. 5 showing a portion of the housing broken away to more clearly show the lens carriage assembly. Referring to FIGS. 4 and 5, lens carriage assembly 40 has a top surface 42 and a generally triangular surface 84. Surface 84 has a generally rectangular slot 86 at the upper end thereof and raised boring surfaces 87A, 87B. Carriage 40 consists further of an elliptical-shaped plate 46 which generally conforms to the shape of aperture 44 (FIG. 2) but of larger dimensions. Plate 46 is slidably mounted on guide rods 90, 92 by means of sleeve bearing 94 and anti-rotation member 96. As previously described, lens 10 is seated within plate 46. The plate, and hence the mounted lens, are thus adapted for horizontal movement along guide rods 90, 92, the plate maintaining a light-tight contact with the underside of surface 42. This horizontal motion is one of two components imparted to the lens which, combined together, provide the required lens motion through a continuous magnification range.

A second, vertical component of motion is imparted to lens carriage 40 and hence to lens 10 by utilizing a portion of the previously described pulley/cable arrangement used to provide platen translation. As shown in FIGS. 4 and 5 carriage 40 is slidably mounted on vertical guide rod 104 which projects downward perpendicularly from housing floor 12 and extends through the apertures in raised surfaces 87A, 87B. Vertical movement is provided to carriage 40 by vertical drive cable 110. Cable 110 is entrained about capstan 112 mounted upon main drive shaft 60. Cable 110 is also entrained about pulleys 114 and 116 and is connected to anchor point 120 located approximately in the center of the raised portion of boring surface 87B. The initial length of cable 110, and hence of lens 10, can be adjusted by means of adjustment screw 122.

With a system magnification change from 1× (FIG. 1) to 0.647× (FIG. 5), the platen is elevated as described above. With the rotation of shaft 60, cable 110 is played out and the weight of carriage 40 causes its descent along rod 104. With a return towards the 1× position, shaft 60 rotates in the opposite direction, winding cable 110 about capstan 112 and providing the force to raise the carriage. A rotational motion of the lens carriage about rod 104 is prevented by a second guide rod 123 shown in FIG. 3.

Relative Illumination Filter

In order to ensure a uniform exposure at photoreceptor belt 20, a relative illumination filter 124 is fixedly mounted below lens 10. The center of the filter is aligned with the center of the lens and the XY plane of the filter is perpendicular to the center line. The filter comprises a circular glass plate having most of its surface covered by a circular coating of varying density with a transparent ring along its outer edge. The density of the coating is maximum in the center of the plate and decreases with increasing radial distance from the center. The filter is designed to compensate for the well known phenomenon of $\cos^4$ falloff of light through the lens as well as lens exit pupil distortion which increases with increasing field angles. An exemplary filter is disclosed in U.S. Pat. No. 4,298,275, assigned to the same assignee as the present invention.

An occluder plate (not shown) is also mounted below the filter to crop the image at belt 20 so that the image assumes the general outline shown in FIG. 1 and to reduce excessive stray light.

Lens Registration

The two lens motions described in the preceding section provide a non-linear path of travel for the lens which is enabled by means of a registration cam arrangement shown in FIGS. 4 and 5. This arrangement comprises registration cam bracket 134, lens cam plate 136 and lens cam follower 138.

Registration cam mounting bracket 134 is bolted to the underside of housing floor 12 in a generally perpendicular orientation. Formed within bracket 134 is a generally rectangular shaped slot 140. Mounted to the inner surface of bracket 134 by screws 142, 144 is lens cam plate 136. Plate 136 has, extending along its length, a generally rectangular shaped slot 146 which has a dogleg 148 at the upper end thereof. The surface 150 of the rectangular-shaped portion of slot 146 is non-linear with a slight upward curvature at the upper end and a gradual flattening out at the lower end. Surface 150 has been formed to provide the corrective motion to the aforementioned lens registration path to enable registration to be maintained through a continuous magnification range.

The lens horizontal position is adjusted at initial assembly by first obtaining the desired image registration point at 1× magnification by axially moving plates 134 and 136. Lens 10 is then translated to the 0.647× position; pivoting the cam plate 136 about pivot screw 142 until the registration point coincides and then tightening screws 142, 144. The geometry of the cam is such that the 1× position does not change.

Plate 46 has a cam follower 138 mounted thereon. The cam follower extends through cam follower slot 86 and projects into cam plate slot 146 so as to ride along cam surface 150. The lens translational path is thus seen to combine the vertical component of motion provided by the pulley/cable arrangement and the horizontal component of motion as constrained by the shape of cam plate slot 146.

Operation in 1× and Reduction

An operational cycle will now be described wherein a document is copied at a 1× magnification and then at a 0.647× magnification. Referring to FIG. 1, a document is placed so that its corner is registered at registration mark 24. The operator will push the appropriate print button applying power to lamp 8. The lamp provides a flash of light which undergoes multiple reflections from all interior surfaces of housing 4 to provide a nominally uniform level of illumination to the document. Sufficient light is reflected from the document and passes through lens 10 onto photoreceptor belt 20 to form a latent document image area 22 of the same dimensions as the document. Belt 20 continues to move, advancing the next unexposed area.

To enable a 0.647× reduction mode, the lens must move towards the photoreceptor and the object and image conjugates must be adjusted for the particular magnification. The objects are accomplished by moving platen frame member 50 to its maximum extended position by means of the cable/pulley/cam mechanism described above and by moving lens carriage 40 along the full length of the non-linear path defined by surface 150.

Upon selection of the 0.647× reduction mode, platen frame member begins to be translated upwards by the rotation of corner cams 59. Simultaneously, cable 110 is played out from capstan 112 allowing the weight of lens carriage 40 to cause its descent along vertical guide rod 104. Lens cam follower and lens 10 initially drop the short vertical distance bounded by dogleg 148. The bottom of this dogleg corresponds to a 0.98× magnification and ensures that any information which may have extended up to the document edge will be projected onto the imaging area of the belt with no loss of information.

Platen frame member 50 continues to be driven upwards exposing additional surfaces of previously covered lower side walls 26, 28, 30, 32. Cam follower 138 (FIG. 5) moving with a horizontal component of motion along cam follower slot 86 now enters the diagonally extending portion of slot 146 and the lens acquires an additional, horizontal, registration adjusted component of motion. As shown in FIG. 3, as the top surface 42 of lens carriage 40 drops away from the housing floor 12, a flexible pleated circular wall 152 is shown attached to floor 12 and surface 42. The wall expands in a downward direction and serves to maintain an optical seal during full vertical translation of the lens. The inner surface of this wall is coated with a diffusely reflective material.

The lens continues its descent along the path defined by cam follower slot 86 and surface 150, and for the time determined by controller circuit 62, until it reaches the position shown in FIGS. 4 and 5. Platen frame member 50 will also reach the fully extended position shown in FIG. 5.

If the next magnification value selected is greater than 0.647×, lens carriage 40 will be moved upward by means of cable 110 causing reverse motion of the lens along surface 150 (path 130). Platen frame member will be lowered as cams 59 reverse their rotation.

The imaging system described above enables a compact imaging module. With the characteristics of the chosen lens, an overall conjugate at 1× of approximately 600 mm is maintained. The overall conjugate is maintained during lens magnification excursion by the prescribed platen movement. Document registration is maintained by the combined vertical, and non-linear horizontal movement of the lens. The entire illumination and imaging module extending from the platen to the photoreceptor can be accommodated in a compact volume of ~5000 in$^3$.

What is claimed is:

1. A compact, flash illumination and imaging optical system for a photocopier comprising in combination:
   a platen member for supporting original documents to be copied;
   an enclosed illumination housing positioned beneath said platen member, said housing having diffuse, highly reflective interior surfaces;
   a flash illumination means within said illumination housing adapted for periodically providing a generally uniform level of illumination at said platen surface,
   a wide angle, relative-illumination compensated lens movably mounted in the floor of said housing for projecting document images along an unfolded optical path onto a photosensitive image plane; and
   means for changing the magnification of said optical system, said means including a first means for changing the platen-to-image plane conjugate and a second means for translating said lens along a non-linear path towards and away from said image plane to project the document image onto the image plane at the desired magnification while maintaining document registration.

2. The optical system of claim 1 wherein said first means includes means for vertically translating said platen.

3. The optical system of claim 2 wherein said platen member comprises a generally rectangular frame member having an aperture thereon which seats the document platen, said frame member having downwardly extending side surfaces which maintain a sliding, light-tight contact with adjacent, stationary housing walls during said platen translation.

4. The optical system of claim 3 wherein said frame member further includes a plurality of cam follower members mounted along the edges of said frame member and wherein said vertical platen translation means includes a plurality of shaft members having mounted at the ends thereof a plurality of cam members, said shaft members mounted along the exterior surface of said housing so as to position said cam members in operative relationship with said cam follower member.

5. The optical system of claim 4 wherein said platen translation means further includes means to rotate said shafts for a period of time associated with a selected system magnification change, whereby said cam members operate against said cam follower member to vertically translate said platen member to a position which compensates for object-to-image conjugate changes introduced by said magnification change.

6. The optical system of claim 1 wherein the area enclosed by said housing varies as a function of the particular magnification.

7. A flash illumination and imaging optical system for an electrophotographic reproduction device, comprising, in combination,
   a transparent platen member for supporting original documents to be reproduced,
   an illumination housing in optical communication with said platen member, said housing containing a flash illumination means adapted to periodically provide a generally uniform level of illumination at said platen surface,
   a projection lens movably mounted in said housing for projecting document images along an unfolded optical path onto a photosensitive image plane, and
   means for changing the magnification of said optical system, said magnification changing means including a first means for changing the platen-to-image plane conjugate and a second means for translating said lens along a non-linear path towards and away from said image plane so that said lens projects the document image onto the image plane at the selected magnification while maintaining document registration.

8. The optical system of claim 7 wherein said housing interior walls present a diffusely reflective surface to said flash illumination.

9. The optical system of claim 7 wherein said lens is a wide angle, relative illumination, compensated lens.

10. The optical system of claim 7 wherein the area enclosed by said housing varies as a function of the particular magnification.

11. The optical system of claim 1 wherein said first means includes means for vertically translating said platen.

* * * * *